(12) United States Patent
Bosselmann et al.

(10) Patent No.: US 6,847,745 B2
(45) Date of Patent: Jan. 25, 2005

(54) WINDING ARRANGEMENT WITH A WINDING BODY AND AN OPTICAL WAVE GUIDE INTRODUCED THEREIN OR THERETHROUGH

(75) Inventors: Thomas Bosselmann, Marloffstein (DE); Nils Theune, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 147 days.

(21) Appl. No.: 10/344,945

(22) PCT Filed: Aug. 6, 2001

(86) PCT No.: PCT/DE01/03006

§ 371 (c)(1),
(2), (4) Date: Feb. 19, 2003

(87) PCT Pub. No.: WO02/15200

PCT Pub. Date: Feb. 21, 2002

(65) Prior Publication Data

US 2003/0156777 A1 Aug. 21, 2003

(51) Int. Cl.⁷ .................................................. G02B 6/00
(52) U.S. Cl. ......................... 385/12; 385/101; 385/137; 358/73.1
(58) Field of Search .............................. 385/12, 54, 56, 385/100, 101, 102, 104; 356/73.1; 439/577

(56) References Cited

U.S. PATENT DOCUMENTS

| | | | | |
|---|---|---|---|---|
| 4,787,705 A | * | 11/1988 | Shinmoto et al. | ........... 385/104 |
| 4,867,527 A | * | 9/1989 | Dotti et al. | .................. 385/101 |
| 5,369,722 A | | 11/1994 | Heming et al. | ............. 385/130 |
| 5,381,504 A | * | 1/1995 | Novack et al. | ............. 385/128 |
| 5,604,836 A | * | 2/1997 | Dunphy et al. | ............. 385/138 |
| 5,651,081 A | * | 7/1997 | Blew et al. | .................. 385/101 |
| 6,173,090 B1 | * | 1/2001 | Simon et al. | .................. 385/12 |

FOREIGN PATENT DOCUMENTS

| | | | | |
|---|---|---|---|---|
| DE | 2237695 | | 2/1974 | ........... H04B/9/00 |
| DE | 4228853 A1 | | 3/1993 | ................. 385/130 |
| DE | 19507941 A1 | | 9/1995 | ........... H01F/27/28 |
| DE | 19962668 C1 | | 12/2000 | ................. 385/12 |
| EP | 0753130 B1 | | 11/1999 | ............ 250/227.17 |
| WO | WO95/13994 | | 5/1995 | ................. 385/128 |
| WO | WO00/57540 | | 9/2000 | ................. 385/110 |

OTHER PUBLICATIONS

Patent Abstracts of Japan, Publication No. 08080011, Publication Date: Mar. 22, 1996.

(List continued on next page.)

*Primary Examiner*—Brian Healy
*Assistant Examiner*—Christopher M. Kalivoda
(74) *Attorney, Agent, or Firm*—Staas & Halsey LLP

(57) ABSTRACT

A winding arrangement comprising at least one multi-layered winding body having a plurality of windings associated with a winding band and an optical waveguide, which is introduced therein or therethrough. The optical waveguide is wound into the winding body in the area where it is introduced therein and comprises, at least in the area, a light-guiding fiber and a protective layer applied thereto. The protective layer consists either entirely or partially of a layer of material having a maximum elasticity module of 2.5 GPa.

21 Claims, 2 Drawing Sheets

OTHER PUBLICATIONS

Patent Abstracts of Japan, Publication No. 55162849, Publication Date: Dec. 18, 1980.

Patent Abstracts of Japan, Publication No. 2000299967, Publication Date: Oct. 24, 2000.

Patent Abstracts of Japan, Publication No. 01054369, Publication Date: Mar. 1, 1989.

Aschmoneit, "Hart, Aber Elastisch Organisch–Anorganische Polymere" Elektronik, vol. 43, No. 23, Nov. 15, 1994, pp. 80, 82–83, 86, 93.

Matejec V et al: "Development of Organically Modified Polysiloxanes for Coating Optical Fibers and Their Sensitivity to Gases and Solvents", Sensors and Actuators B, vol. 39, No. 1–3, Mar. 1, 1997, pp. 438–442.

Meunier et al., "Industrial Prototype of a Fiber–Optic Sensor Network for the Thermal Monitoring of the Turbogenerator of a Nuclear Power Plant–Design, Qualification, and Settlement", Journal of Lightwave Technology, IEEE. vol. 13, No. 7, Jul. 1, 1995, pp. 1354–1361.

Lequime, "Fiber Sensors for Industrial Applications", 12th International Conference on Optical Fiber Sensors, Oct. 28–31, 1997, pp. 6–71.

Fevrier et al., "A Temperature Optical Fiber Sensor Network: From Laboratory Feasibilit to Field Trial", 8th Optical Fiber Sensors Conference, Jan. 29–31, 1992, pp. 262–265.

* cited by examiner

WINDING ARRANGEMENT WITH A WINDING BODY AND AN OPTICAL WAVE GUIDE INTRODUCED THEREIN OR THERETHROUGH

CROSS REFERENCE TO RELATED APPLICATIONS

This application is based on and hereby claims priority to PCT Application No. PCT/DE01/03006 filed on 6 Aug. 2001 and German Application No. 100 39 958.4 filed on 16 Aug. 2000, the contents of which are hereby incorporated by reference.

BACKGROUND OF THE INVENTION

One aspect of the invention relates to a winding arrangement with at least one multi-layered wound body comprising a large number of windings of at least one winding band and an optical waveguide passed through the wound body or introduced into the wound body.

Such a winding arrangement may be used for example in an optically monitored electrical device in the area of electrical power generation and distribution. The electrical device may in this case be designed as an electrical generator or else as an electrical transformer. Such an electrical device represents a very expensive and long-term investment. Its failure may entail very high costs. Therefore, the use of a diagnostic system, which may in particular also comprise an optical measuring device, is increasingly being considered for the early detection of defects, such as for example overheating or electrical flashover. The structural design of the device used in electrical power generation is currently already optimized in many varied respects. In particular, a very compact form of construction has by now been achieved, a design in which a sensor with a relatively great space requirement cannot be accommodated in the active part of the electrical device without extensive redesigning of the electrical device. What is more, there is often a great potential difference between different parts of such an item of equipment, possibly reaching values of up to several 10 kV. Therefore, an electrical sensor often cannot be used in such an electrical device. Far better suited on the other hand is an optical sensor, in particular a fiber-optic sensor. This is because the latter has a very small overall size. Moreover, due to the dielectric feed in the form of an optical waveguide, even a great potential difference can be bridged without any problem.

On the basis of these advantages, an optical measuring device for monitoring an electrical device used in electrical power generation and distribution has already frequently been described. For instance, the general article "*Fiber Sensors for Industrial Applications*" by M. Lequime, 12*th International Conference on Optical Fiber Sensors,* 10.28–31.1997, pp. 66–71, discloses an optical measuring device for an electrical generator. In the case of this measuring device, the vibration spectrum and the temperature of the coolant used for cooling an electrical conductor are sensed by an optical sensor.

An optical measuring device is also described in the specialist article "*A Temperature Optical Fiber Sensor Network: From Laboratory Feasibility to Field Trial*" by H. Fevrier et al., 8*th Optical Fiber Sensors Conference,* 01.29–.31.1992, pp. 262–265. Here, a fiber-optic sensor network serves for virtually distributed temperature sensing in a 250 MW generator.

Another optical measuring device for sensing the temperature in a 900 MW turbo generator is known from the specialist article "*Industrial Prototype of a Fiber-Optic Sensor Network for the Thermal Monitoring of the Turbogenerator of a Nuclear Power Plant—Design, Qualification, and Settlement*" by C. Meunier et al. in *Journal of Lightwave Technology,* Vol. 13, No. 7, July 1995, pp. 1354–1361. The optical temperature sensors in the case of this measuring device are adhesively attached to a water connection element which is located in the outlet region of the coolant line from an electrical conductor.

In the case of these known optical measuring devices, in each case only indirect measured variable acquisition is performed, or no specific details are given on how the feeding optical waveguide is brought up to an electrical conductor to be monitored and the optical sensor is attached there. Since, during operation, the conductors of such an electrical device often carry a very high electrical current, which may assume values up into the kA range, the conductor temperature is an important measured variable for the diagnosis of the device. To obtain a measurement result which is as accurate as possible, it is favorable to position the optical sensor, and consequently also the feeding optical waveguide, as close as possible to the current-carrying conductor. Since, for reasons of insulation, the electrical conductor is often surrounded by an electrical insulation in the form of a wound body, the requirement for measured variable acquisition that is as direct as possible leads to the optical sensor and also the part near the sensor of the feeding optical waveguide being arranged in the interior of the wound body, to be more specific between the electrical conductor and the wound body. In the case of the known optical measuring devices, on the other hand, this requirement does not exist on account of the only indirect measured variable acquisition. In principle, contact that is as direct as possible between the electrical conductor and the part of the optical waveguide near the sensor is not envisaged.

In EP 0 753 130 B1, an optical waveguide embedded in a multi-layered composite structure is described. A force to be detected is transmitted through the disclosed special composite structure to the fiber-optic sensor. How precisely the optical waveguide is led out of the composite structure is not revealed by EP 0 763 130 B1.

WO 95/13994 A1 discloses a series of types of optical waveguide which have a protective layer in various embodiments. Special suitability of the individual types of optical waveguide for use in one of the measuring devices described above is not specified.

The object maybe achieved by providing a winding arrangement with at least one multi-layered wound body comprising a large number of windings of at least one winding band and an optical waveguide passed through the wound body or introduced into the wound body, with which arrangement guidance of the optical waveguide through the wound body is possible.

To achieve the object, a winding arrangement corresponding to the features of patent claim 1 is specified.

The winding arrangement comprises at least one multi-layered wound body comprising a large number of windings with at least one winding band, an optical waveguide passed through the wound body or introduced into the wound body, the optical waveguide being wound into the wound body in the area where it passes through or is introduced and comprises, at least in the area where it passes through or is introduced, a light-guiding fiber and a protective layer applied thereto, which protective layer comprises a material for a protective layer with a modulus of elasticity of at most 2.5 GPa.

SUMMARY OF THE INVENTION

One aspect of the invention is based on the recognition that, in spite of the high mechanical loads on the optical waveguide possibly occurring during the production of the wound body, it is favorable to wind the optical waveguide directly into the wound body. Consequently, in particular, in the area where it passes through or is introduced, the optical waveguide runs without a separate mechanical protective sleeve extending over the entire length of this area. This is because, specifically when it is used in a device for electrical power generation and distribution, in which the wound body serves for the insulation of a high electrical voltage, such a separate protective sleeve may be the source of an electrical flashover. It was recognized that a flashover can be avoided if the optical waveguide is laid directly within the wound body.

To provide protection against the mechanical loading occurring within the wound body, an optical waveguide in which the light-guiding fiber is not surrounded by an otherwise customary acrylate protective layer but by some other mechanically and/or thermally more stable protective layer, at least in the area where it passes through or is introduced, is used. This protective layer then represents in particular an armoring for the light-guiding fiber. This is because the brittle acrylate normally used as the material for the protective layer, for which the brief designation PMMA is also customary, does not offer adequate mechanical protection from the mechanical loading occurring within the wound body. The brittle mechanical behavior of acrylate is also documented by a modulus of elasticity of approximately 3.3 GPa. By contrast, the material for the protective layer used instead, with a modulus of elasticity of at most 2.5 GPa, protects the optical waveguide very well from the mechanical forces occurring in the wound body. It consequently prevents destruction of the optical waveguide. The protective layer may in this case comprise entirely or only partially of this advantageous material for the protective layer.

In the case of a preferred embodiment, the optical waveguide is guided within an additional protective grommet. This additional protective grommet is very short and prevents the optical waveguide from apping off where it leaves the wound body. This increases the mechanical protection of the optical waveguide. A protective grommet, which is provided only in the outermost winding layer, also does not lead to an increased flashover tendency.

It is favorable if the material for the protective layer has a modulus of elasticity of at most 1.5 GPa. This further increases the mechanical protective effect.

In the case of a further preferred refinement, the material for the protective layer does not contain any solvent. The solvent-free material for the protective layer brings about a very high thermal stability of the optical waveguide. The optical waveguide can then be used in a wide temperature range. In particular, a minimum operating temperature of below −50° C., preferably even of below −100° C., is possible. Similarly, a maximum operating temperature of above +120° C., preferably even of above +200° C., is possible. By contrast, acrylate is specified only for a temperature range of between −40° C. and +85° C.

In addition, there is also an embodiment in which the material for the protective layer has an inorganic solids content. The inorganic solids content improves both the mechanical stability and the thermal stability. In particular, inorganic solids content in the material for the protective layer of at least 50% is favorable. This is because the permissible maximum operating temperature increases with the inorganic solids content.

The material for the protective layer preferably comprises ORMOCER® (Organic Modified Ceramics), which is in particular solvent-free. The descriptive name, ORMOCER®, is a registered trademark of Fraunhofer Gesellschaft zur Förderung der angewandten Forschung e.V., a Fraunhofer Society for Promotion of Applied Research. ORMOCER® is a composite material, which is composed of organic and inorganic constituents. Depending on the content of the inorganic solids, in ceramic form, the modulus of elasticity and also the permissible temperature range can be set. In the case of ORMOCER®, which is used as the material for the protective layer of an optical waveguide, the modulus of elasticity lies in particular between 0.02 GPa and 1.5 GPa. A typical value is 0.2 GPa. Consequently, compared with the standard material acrylate, ORMOCER® has a much higher mechanical protective effect for the enclosed light-guiding fiber. Consequently, an optical waveguide comprising an optical fiber coated in this way can also be used in severe conditions, such as in an electrical generator or an electrical transformer.

A variant in which the protective layer comprises two plies is favorable. This allows the protective layer to be designed both with regard to the requirement for adhesion on the light-guiding fiber and with regard to the requirement for mechanical and thermal stability. In particular, it is preferred if the first ply, which is applied directly to the optical fiber, comprises of polyimide and the second fiber, applied to the latter, comprises of the material for the protective layer. In particular, polyimide has very good adhesive properties on the optical fiber in the form of a glass fiber. Furthermore, polyimide can be used in a very wide temperature range from −190° C. to +385° C. The material for the protective layer, provided for the second ply, then primarily has the purpose of providing adequate mechanical protection.

It is also advantageous if the optical waveguide has, at least in the area where it passes through or is introduced, a diameter of at most 1 mm. This dimensioning applies to the overall construction comprising the optical fiber and the surrounding protective layer. An optical waveguide of this type only has an insignificant detrimental effect on the properties of the wound body. This also specifically applies to the insulating properties of an insulating wound body. These insulating properties play a decisive role in particular in the area of electrical power generation and distribution. The optical waveguide with a correspondingly small diameter then also does not in particular form a potential source of an electrical flashover.

BRIEF DESCRIPTION OF THE DRAWINGS

These and/or other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
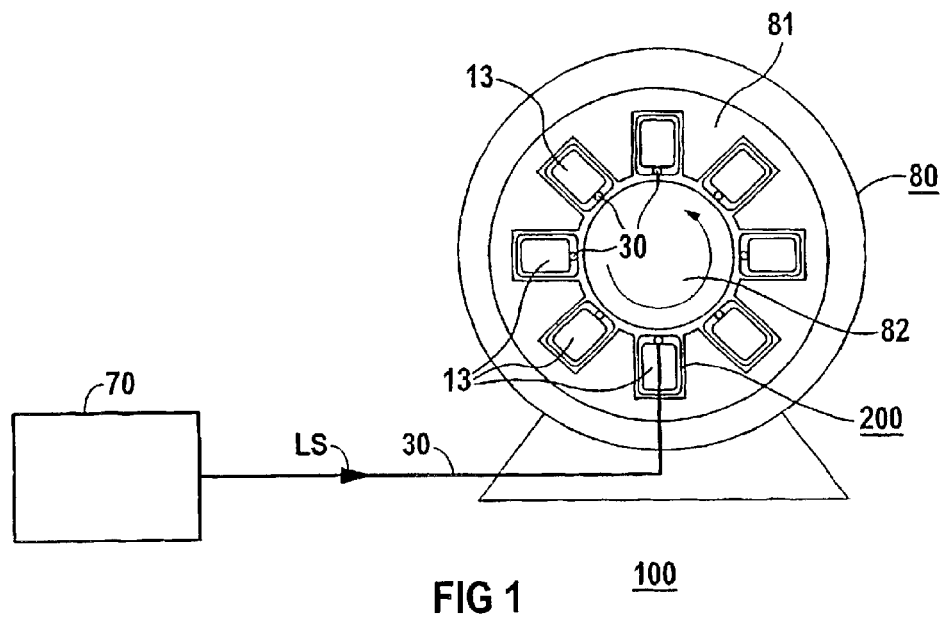
FIG. 1 shows a winding arrangement with a wound body and an optical waveguide as a component part of an electrical generator monitored by an optical measuring device.

Reference will now be made in detail to the preferred embodiments of the present invention, examples of which are illustrated in the accompanying drawings, wherein like reference numerals refer to like elements throughout.

Parts corresponding to one another are provided with the same reference numerals in FIGS. 1 to 4.

Indicated in FIG. 1 is an electrical generator 80, which comprises a stator 81 and a rotor 82. The electrical generator 80 is monitored by an optical measuring device 100, which is intended for optical measured variable acquisition with the generator 80. The optical measuring device 100 includes an evaluation device 70, which is arranged outside the generator 80 and is optically connected to the interior of the generator 80, in particular to the stator 81, via an optical waveguide 30. By a light signal LS transmitted via the optical waveguide 30, at least one optical measuring point in the generator 80 is interrogated. The electrical generator 80 represented in FIG. 1 is designed for a high electrical power output, in particular of over 100 MW.

In the generator 80, currents of up to several kA and differences in potential of up to several 10 kV occur. Instead of being used for the electrical generator 80 shown by way of example in FIG. 1, the optical measuring device 100 may equally well be used for an electrodynamic prime motor, such as a synchronous motor or an asynchronous motor, which is very similar in its structural design to that of the electrical generator 80. Furthermore, the optical measuring device 100 can also be used for a power transformer, the operating voltage of which may be up to several 100 kV. With the optical waveguide 30, such a high potential difference can in principle be bridged without any problem. The optical components used do not have any detrimental effect on the dielectric strength of the electrical generator 80.

The optical waveguide 30 is led to an electrical conductor 13, which is arranged within a slot of the stator 82, as a component part of a stator winding. Located directly on the conductor 13, there is also at least one optical sensor (not represented in any more detail) for direct measured variable acquisition.

In the interior of the electrical generator 80 there is consequently at least one electrical conductor arrangement 200 (shown in more detail in FIG. 2), which comprises the electrical conductor 13 and a winding arrangement 90 arranged around it. The winding arrangement 90 for its part comprises an electrical insulation in the form of a multi-layered wound body 91 and also an optical waveguide 30 passed through the wound body 91 in an area for passing through 95. The optical waveguide 30 is arranged in a portion near the sensor between the insulation and the electrical conductor 13.

Figure 2:
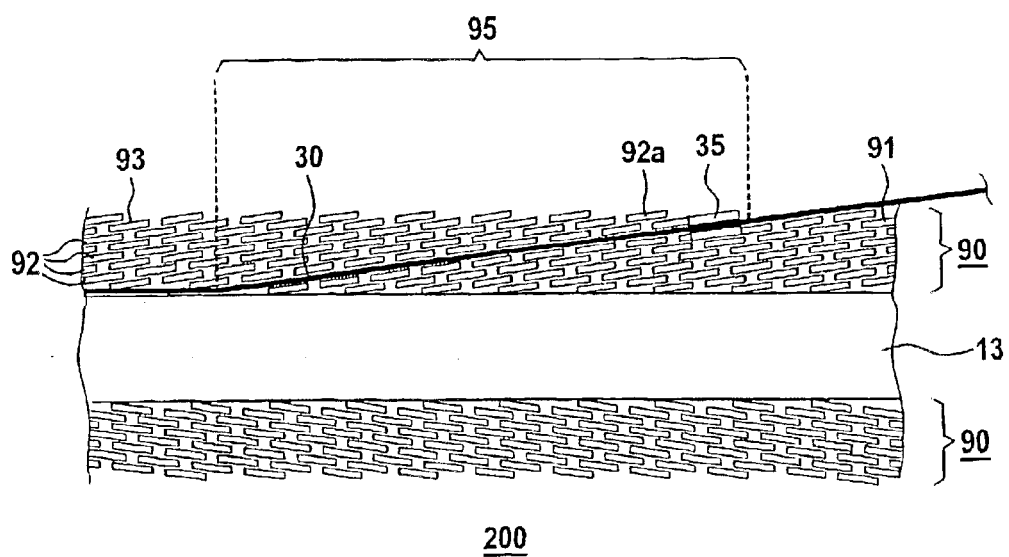
FIG. 2 shows a longitudinal section through the winding arrangement from FIG. 1, and FIGS. 3 and 4 show embodiments of the optical waveguide used in the winding arrangement according to FIGS. 1 and 2.

Represented in FIG. 2 is a longitudinal section of the electrical conductor arrangement 200 in the area in which the optical waveguide 30 is passed through the insulation. The insulating wound body 91 contains a number of winding layers 92, which are produced by successive application of a large number of windings of at least one insulating winding band 93 to the electrical conductor 13.

In the area for passing through 95, the optical waveguide 30 is wound into the wound body 91. It consequently runs in particular between two windings from one winding layer 92 to the next. The bare optical waveguide 30 is preferably located in addition to at the last winding layer 92a, as viewed from the electrical conductor 13, in direct contact with the wound body 91. On the other hand, in the exemplary embodiment shown, at the location where it passes through the outermost winding layer 92a, the optical waveguide 30 is surrounded by an additional protective grommet 35, which prevents snapping off of the optical waveguide 30 at the point at which it leaves the wound body 91.

Figure 3:
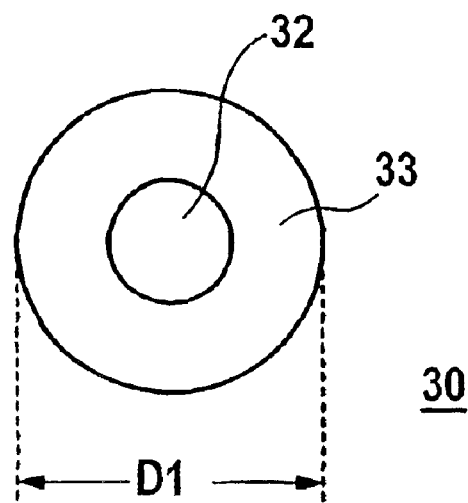

According to the cross-sectional representation of FIG. 3, in the area where it passes through 95, apart from the outermost winding layer 92a, the optical waveguide 30 is protected against mechanical loading within the wound body 91 only by a special protective layer 33 of ORMOCER®. The protective layer 33 has in this case in particular armoring characteristics. It is applied to a fiber 32, which serves for the actual light guidance. Usually, such a protective layer is referred to in specialist literature as a coating. The fiber 32 comprises a light-guiding core and a cladding. Neither are represented in any more detail in FIG. 3. The protective layer 33 has a layer thickness of typically 30 µm. The fiber 32 is a glass fiber with a diameter of 125 µm. This produces for the optical waveguide 30 an outer diameter D1 of approximately 185 µm.

On account of its good mechanical properties, ORMOCER® is particularly well-suited as a material for the protective layer. It offers good mechanical protection for the optical waveguide 30.

ORMOCER® is a composite material, which is made up of organic and inorganic constituents. The mechanical and thermal behavior can be set by the mixing ratio. For instance, the modulus of elasticity can assume values of between 0.02 GPa and 1.5 GPa. A typical value, which also leads to good mechanical protection for the optical waveguide 30, lies around 0.2 GPa. With an increase in the inorganic content, the maximum permissible operating temperature can also be raised. This is of significance in particular for an application in the electrical generator 80 from FIG. 1, since temperatures of sometimes significantly above 100° C. can occur both during the production of the insulating wound body 91 and during the operation of the generator. The ORMOCER® used in this application as the material for the protective layer for the optical waveguide 30 typically has an inorganic content of approximately 85%.

In order not to have any detrimental effect on the dielectric strength of the insulating wound body 91, a dielectric, i.e. electrically insulating, material for the protective layer is required in the case of the exemplary embodiment of the electrical generator 80. ORMOCER® likewise satisfies this condition.

Figure 4:
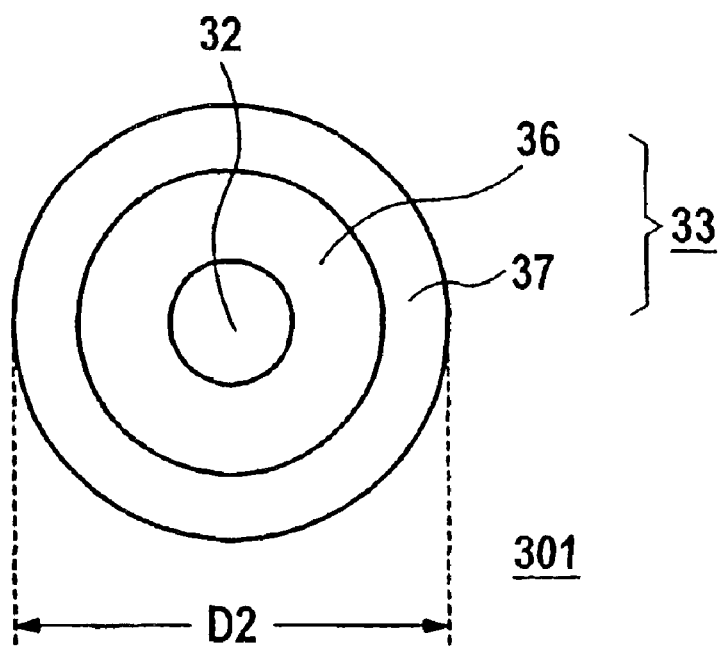

In the case of another exemplary embodiment of an optical waveguide 301, the protective layer 33 according to FIG. 4 comprises a first ply 36 and a second ply 37. Polyimide is provided as the material for the first ply 36 and ORMOCER® as the material for the second ply 37. The layer thickness of the first ply ranges between 5 and 15 µm. Polyimide adheres very well on the fiber 32 in the form of a glass fiber and, furthermore, is also thermally very stable. The outer coating with ORMOCER® within the second ply 37 lends the protective layer 33, and consequently the optical waveguide 301, a high resistance overall to themechanical loading occurring in the wound body 91. With the double-ply coating, a diameter D2 of between 200 and 250 µm is obtained for the optical waveguide 301.

Both the diameter D1 in the case of the single-ply coating according to FIG. 3 and the diameter D2 in the case of the two-ply coating according to FIG. 4 are small enough to rule out any detrimental effect on the properties of the wound body 91. In particular, the insulating properties of the wound body 91 are not lessened by the optical waveguides 30 and 301. This also applies to an optical waveguide not represented with a diameter of up to 1 mm. Only when there is an even greater diameter, in an application for example within the generator 80 from FIG. 1, does the risk of flashover increase in the area where it passes through 95. A flashover channel can form along such a thick optical waveguide. This is avoided by the use of an optical waveguide with a diameter of less than 1 mm.

In the case of an embodiment not shown, the wound body 91 is not wound from an electrically insulating winding band 93 as in the example of FIG. 2, but from an electrically conductive band. In particular, this conductive band may also have a superconducting, preferably a high-temperature superconducting property. Instead of the electrical conductor 13 from FIG. 2, in the case of this embodiment a winding carrier adapted to the specific application is then used. By contrast, the passing of the optical waveguide 30 through the wound body 91 and the configuration of the protective layer 33 also takes place in this embodiment in a way analogous to the example of FIG. 2.

In the case of a further embodiment not shown, the optical waveguide 30 is not passed through the wound body 91 but is only introduced into the wound body 91. In the case of this further embodiment, the optical waveguide 30 then also runs within the wound body 91 between two winding layers 92 after the area of introduction. In addition, at least one optical sensor, intended for acquiring a measured variable, is arranged for example within the wound body 91 between two winding layers 92. This optical sensor is interrogated via the optical waveguide 30.

The invention has been described in detail with particular reference to preferred embodiments thereof and examples, but it will be understood that variations and modifications can be effected within the spirit and scope of the invention.

What is claimed is:

1. A winding arrangement, comprising:
    at least one multi-layered wound body, the multi-layered wound body having a large number of windings with at least one winding band;
    an optical waveguide wound into the windings such that the optical waveguide extends at least partially through the wound body, and at least in the area where the optical waveguide is surrounded by windings, the optical waveguide comprising:
        a light-guiding fiber, and
        a protective layer formed of a material having a modulus of elasticity of at most 2.5 GPa.

2. The winding arrangement as claimed in claim 1, further comprising a protective grommet provided for the optical waveguide in an area where the optical waveguide is only partially surrounded by the windings, adjacent to an outermost winding of the wound body.

3. The winding arrangement as claimed in claim 1, wherein the material for the protective layer has a modulus of elasticity of at most 1.5 GPa.

4. The winding arrangement as claimed in claim 1, wherein the material for the protective layer is solvent-free.

5. The winding arrangement as claimed in claim 1, wherein the material for the protective layer has an inorganic solids content.

6. The winding arrangement as claimed in claim 5, wherein the inorganic solids content of the material for the protective layer is at least 50%.

7. The winding arrangement as claimed in claim 5, wherein the material for the protective layer is ORMOCER®.

8. The winding arrangement as claimed in claim 5, wherein the material for the protective layer is an organically modified ceramic.

9. The winding arrangement as claimed in claim 1, wherein the protective layer comprises a double ply coating.

10. The winding arrangement as claimed in claim 9, wherein
    the protective layer has first and second plies,
    the first ply of the protective layer comprises polyimide and is applied to the light-guiding fiber, and
    the second ply of the protective layer is applied to the first ply and is formed of the material having a modulus of elasticity of at most 2.5 GPa.

11. The winding arrangement as claimed in claim 1, wherein the optical waveguide has, at least in the area where it is surrounded by the windings, a diameter of at most 1 mm.

12. The winding arrangement as claimed in claim 2, wherein the material for the protective layer has a modulus of elasticity of at most 1.5 GPa.

13. The winding arrangement as claimed in claim 12, wherein the material for the protective layer is solvent-free.

14. The winding arrangement as claimed in claim 13, wherein the material for the protective layer has an inorganic solids content.

15. The winding arrangement as claimed in claim 14, wherein the inorganic solids content of the material for the protective layer is at least 50%.

16. The winding arrangement as claimed in claim 15, wherein the material for the protective layer is ORMOCER®.

17. The winding arrangement as claimed in claim 16, wherein the material for the protective layer is an organically modified ceramic.

18. The winding arrangement as claimed in claim 17, wherein the protective layer comprises a double ply coating.

19. The winding arrangement as claimed in claim 18, wherein
    the protective layer has first and second plies,
    the first ply of the protective layer comprises polyimide and is applied to the light-guiding fiber, and
    the second ply of the protective layer is applied to the first ply and is formed of the material having a modulus of elasticity of at most 2.5 GPa.

20. The winding arrangement as claimed in claim 19, wherein the optical waveguide has, at least in the area where it is surrounded by the windings, a diameter of at most 1 mm.

21. The winding arrangement as claimed in claim 1, wherein the optical waveguide is connected to an optical sensor.

* * * * *